United States Patent [19]

Oshinsky

[11] 4,424,620

[45] Jan. 10, 1984

[54] METHOD OF MACHINING A KNUCKLE CASTING

[75] Inventor: Frank W. Oshinsky, McKeesport, Pa.

[73] Assignee: McConway & Torley Corporation, Pittsburgh, Pa.

[21] Appl. No.: 288,597

[22] Filed: Jul. 30, 1981

[51] Int. Cl.³ .............................................. B23Q 7/00
[52] U.S. Cl. ..................................... 29/558; 29/527.6; 51/3; 408/27; 408/37; 408/70
[58] Field of Search ....................... 29/527.6, 558, 563, 29/33 P; 51/5 E, 3; 408/27, 37, 70; 213/109, 110

[56] References Cited

U.S. PATENT DOCUMENTS

| | | | |
|---|---|---|---|
| 1,452,103 | 4/1923 | Yerxa | 408/37 |
| 1,495,463 | 5/1924 | Tomlinson | 213/109 |
| 1,730,650 | 10/1929 | Evans | 51/5 E UX |
| 2,139,403 | 6/1938 | Cole | 29/33 P |
| 2,156,692 | 5/1939 | Hixon | 29/527.6 X |
| 2,160,476 | 5/1939 | Kampmeier | 29/33 R UX |
| 2,392,169 | 1/1946 | Mansfield | 29/33 P |
| 2,654,463 | 10/1953 | Church | 408/70 X |
| 3,172,192 | 3/1965 | Dresden | 29/527.6 X |
| 3,833,312 | 9/1974 | Miles et al. | 29/563 X |
| 4,206,849 | 6/1980 | Kaim | 213/109 X |

*Primary Examiner*—Charlie T. Moon

*Attorney, Agent, or Firm*—Thomas H. Murray; Clifford A. Poff

[57] ABSTRACT

A knuckle casting for a railroad coupler is carried by a conveyor to successively-disposed stations. At a first station, the knuckle casting is positioned relative to reaming tools at opposite sides of the conveyor. Position control arms carry conical members to engage with a pivot pin opening in the knuckle casting and hold-down arms support the casting while the pivot pin opening is reamed to a desired size. Thereafter, the knuckle casting is moved to a rough-grinding station where it is engaged by pin members, one of which extends into the reamed pin hole opening. The knuckle casting is raised to a position above the conveyor where it is rotated for contact with a grinding wheel. The position of the grinding wheel is controlled by a cam driven by an arbor shaft used to support the casting. A cam follower moves a frame that supports the grinding wheel to position the grinding wheel according to a desired contour. After the rough-grinding operation is completed, the knuckle casting is lowered onto the conveyor for advancement to a finish-grinding machine where a similar lifting apparatus engages the knuckle casting. The knuckle casting is raised so that the surface thereof engages a driven grinding belt under a predetermined control pressure while the casting is rotated for processing the surface thereof. After the finish-grinding operation is completed, the casting is returned to the conveyor and advanced to a discharge station.

5 Claims, 5 Drawing Figures

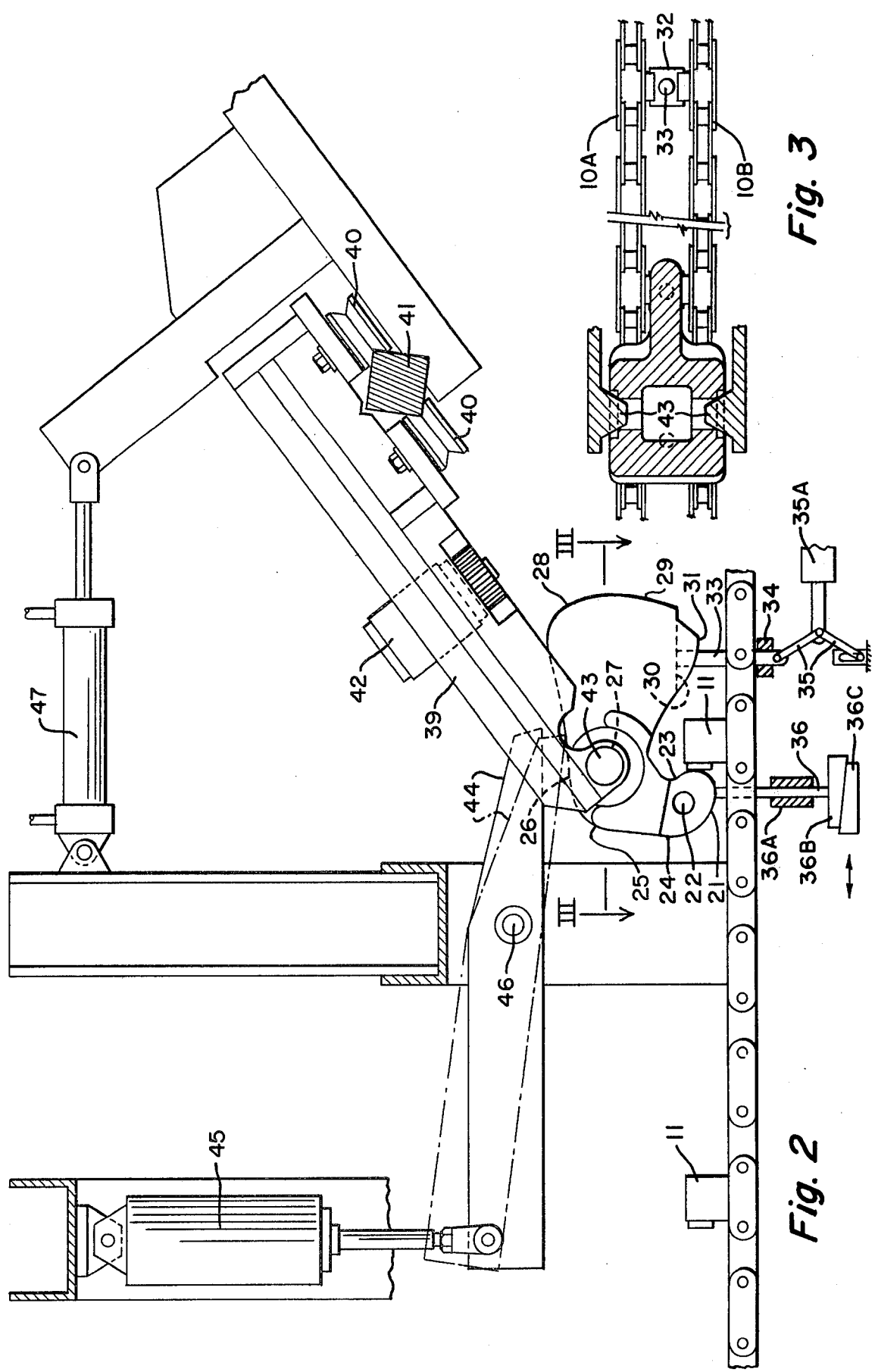

METHOD OF MACHINING A KNUCKLE CASTING

BACKGROUND OF THE INVENTION

This invention relates to a method and apparatus for machining a metal knuckle casting to meet dimensional and profile requirements for use in a standard AAR railroad coupler. More particularly, the present invention relates to such a method and apparatus to eliminate the inaccurate, laborious and time-consuming chipping and hand-grinding operations heretofore required for as-cast knuckle castings.

As is known in the art, railroad couplers used with rolling stock to carry freight, are made up of an assembly of parts, most of which are castings. The rough castings removed from the molds must be suitably cleaned and undergo some manual finishing operations to meet standards by the Association of American Railroads (AAR) for use in car couplers for freight service. The parts forming Type E, Type E/F and Type F AAR freight couplers all include coupler knuckles which have substantially the same configurations, although Type F knuckles are not identical to Type E knuckles. The couplers of the various types have other well-known distinctive differences. The coupler knuckles generally comprise a forward nose and a rearward tail containing a locking face. A pivot pin hole in the central knuckle body receives a pin member which is engaged by pivot lugs projecting outwardly from the knuckle side of a coupler head so that the nose portion of the knuckle can pivot away from and toward a front face in the coupler head. The nose portion of the knuckle swings towards the front face of the coupler head to the locked position when engaging with the nose portion of a knuckle of a mating coupler when the couplers are coupled together. Under pull, pulling faces on the nose portions of the locked knuckles engage each other. At the same time, a gap will exist between front face portions of the locked knuckles and the front faces of the mating couplers. This space generally determines the amount of slack in the couplers' 10-A contour areas between pull and buff.

Both the contour and the dimensions of the nose portion of the knuckle as well as the tail portion must meet AAR standard gage requirements. Any fins and lumps must be removed from the exterior areas of the pin hole hubs and it is usually necessary to hand-grind portions of the outer peripheral area of the knuckle casting to meet gaging requirements. Usually a portable grinder is directed by a workman along a path to smooth and remove surface imperfections from the knuckle casting. Subsequent inspection and gaging of the knuckle casting are carried out to assure suitability of the semi-finished casting. A protruding fin or parting line is generally present on the casting because of incomplete contact between the mating surfaces on the cope and drag halves of the mold. The fin or parting line extends along a peripheral surface of the casting forming one predominant area that requires extensive hand-grinding operations. The knuckle is generally symmetrical about the mold parting line. The opening in the casting to receive pivot pin extends perpendicular to the plane of the mold parting line. The hand-grinding operations are usually required across the front face of the knuckle casting from the nose portion thereof to a curved heel portion and thence to the outer surface of the hubs. From the surface of the hubs rearwardly, the hand-ground area extends to a tail stop that is the generally rearward extremity of the casting and intersects at a generally right-angle relation with a tail surface.

Grinding of these surfaces is achieved by the method and apparatus of the present invention to provide the required clearances of a proper fit within the coupler body and other parts for reliable operation of the coupler. Fitting of the knuckle with proper clearances between the rear of the knuckle tail and the front of a lock face of a lock in the coupler is very important for the lock set, knuckle throw and lock drop functions of the coupler. A clearance is necessary for dropping of the lock to the locked position. This requires grinding of the knuckle casting at the rear of the tail, the tail stop, the vertical area of the hub wall, areas between the tail stop and the hub for fit within the coupler body. Grinding of other knuckle areas must be carried out to assure proper engagement with a mating coupler and its knuckle. This includes grinding to a required knuckle contour for a proper fit in areas between the knuckle and the coupler front face, the knuckle nose and the body guard arm as well as throat faces of both of the couplers. AAR standards specify grinding to a "10-A" contour to assure that the knuckle heel, the front face and the nose portion of the knuckle always have adequate clearance when joining with a mating coupler and its knuckle and for hinge movement of the mating coupler for proper tracking about horizontal track curves. It is neither necessary nor desirable to undertake extensive machining operations and incur the cost to machine all surfaces on the knuckle casting.

SUMMARY OF THE INVENTION

It is an object of the present invention to provide a method and apparatus for grinding surface areas of a knuckle casting for use in a railroad coupler to required contours according to AAR standards and dispensing with laborious, time-consuming hand-grinding operations.

It is a further object of the present invention to provide a method and apparatus for consistently producing required AAR standard surface contours on a knuckle casting by machining operations including reaming a pivot pin hole in the casting for use as a point of reference.

According to the present invention, there is provided a method for processing a knuckle casting for a railroad coupler wherein the casting includes a nose portion to engage with the nose portion of a knuckle of a mating coupler when the couplers are coupled together, the knuckle casting having an outer peripheral surface defining inter alia a front face extending from said nose portion laterally and rearwardly to a heel adjacent a surface of hubs for a pivot pin opening through the body of the knuckle casting, the knuckle casting rearwardly of the hub having a tail stop merging with a tail surface forming a generally rearward extremity of the casting, the method including the steps of moving the knuckle casting to a reaming station with the pivot pin opening extending transverse to the direction of movement, aligning the pivot pin opening in the knuckle casting with reaming means, holding the aligned knuckle casting while reaming the pivot pin opening to a desired size, moving the knuckle casting to a lifting station, supporting the knuckle casting at the lifting station for rotation about an axis generally parallel to the axis of the reamed pivot pin opening, grinding at least a front face, heel, tail stop and tail surface of the knuckle casting to a preestablished profile while rotating the casting about an axis generally parallel with the axis of the reamed pivot pin opening, and thereafter contacting at least part of the outer peripheral surface of the knuckle casting while rotated about an axis generally parallel to the axis of the reamed pivot pin opening with a machine member under a predetermined pressure to machine finish-grind the contacted surfaces.

According to another aspect of the present invention there is provided an apparatus to machine-grind a knuckle casting having a pivot pin opening to receive a pin member for pivotal movement of the casting in a railway coupler, the apparatus including a knuckle holder having an arbor projecting from one side and knuckle-engaging members projecting from the opposite side to engage and rotate a knuckle casting about an axis generally parallel with the pivot pin opening, an elongated housing to rotatably support the arbor of the knuckle holder, means to rotate the knuckle holder relative to the housing, a support for the housing, means to advance the knuckle holder for engaging and releasing a knuckle casting, means for elevating the holder to a working station, grinding means at said working station for grinding at least part of the outer peripheral surface of the knuckle casting, and control means for maintaining a predetermined working contact between the grinding means and the knuckle casting.

The method and apparatus of the present invention have preferred and greater details which will be apparent to those skilled in the art when the following description is read in light of the accompanying drawings, in which:

FIG. 1 schematically illustrates a preferred form of apparatus which is also useful to carry out the method for processing knuckle castings according the present invention;

FIG. 2 is an enlarged elevational view illustrating the arrangement of parts for aligning a knuckle casting for reaming a pivot pin hole opening therein;

FIG. 3 is a sectional view taken along line III—III of FIG. 2;

Figure 1:
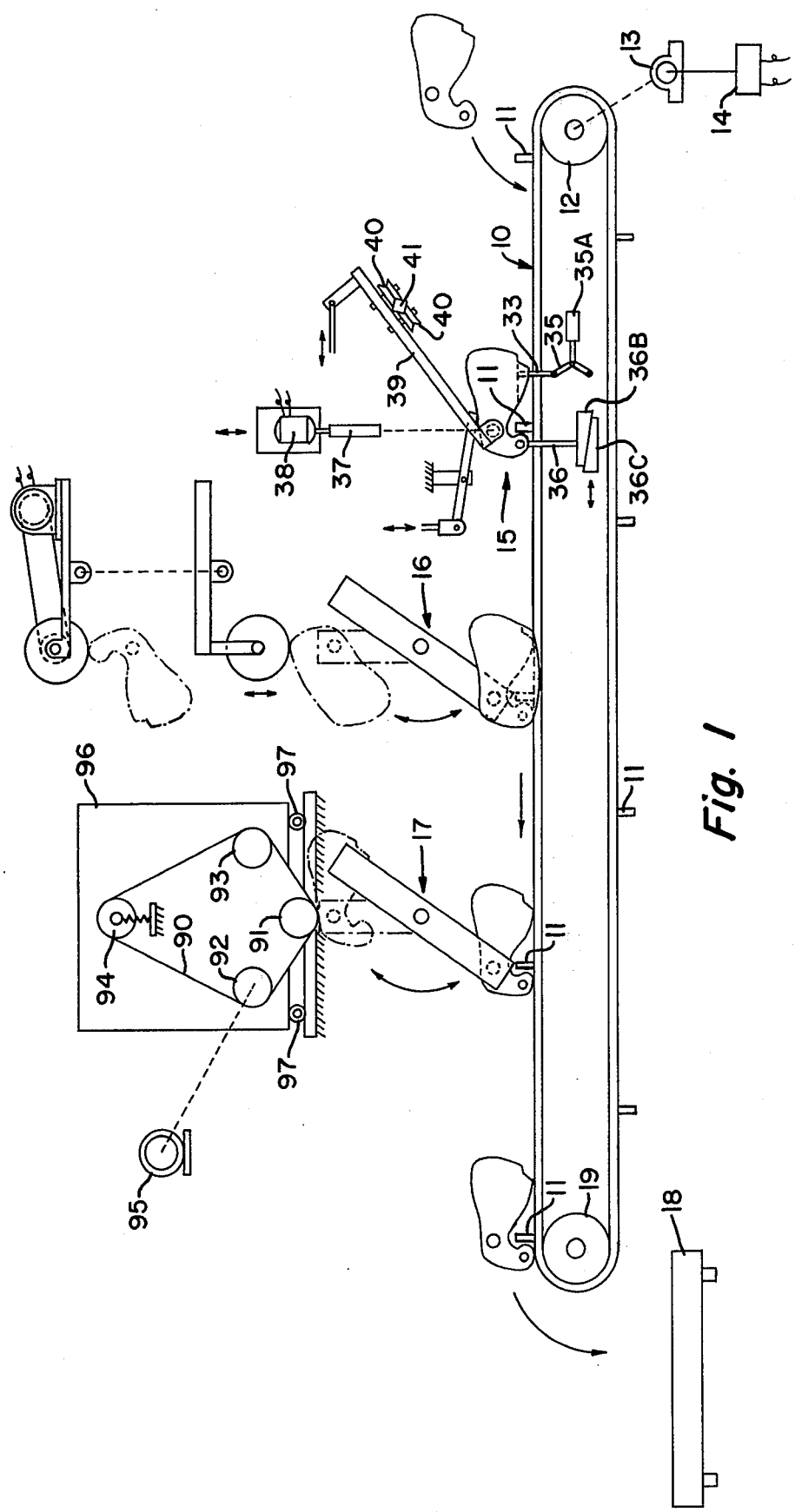

Referring to FIG. 1, there is schematically illustrated a roller link conveyor 10 with upstanding dog attachments 11 at spaced locations along the length of the conveyor, each engaging with a knuckle casting. At the entry end of the conveyor, there is a sprocket 12 coupled to a motor 13. The dog attachments 11 and knuckle casting engaged therewith on the conveyor are indexed by a motor control 14 from an entry station to a predetermined position at a reaming station 15 and downstream therefrom to a first grinding station 16 and a second grinding station 17. At the discharge end of the conveyor, machine-ground knuckle castings are removed from the conveyor and placed into a container or on pallet 18. A sprocket wheel 19 is located at the delivery end of the conveyor. Prior to loading of a knuckle casting onto the conveyor, the casting is subjected to minor hand-grinding and chipping operations to remove fins and lumps from only specific surfaces of the castings. Also, welding may be performed if necessary to repair defects that sometimes occur during the casting process. After a knuckle casting is placed on the conveyor, control 14 energizes the motor 13 to advance the knuckle casting to the reaming station 15 where a limit switch or other sensing device detects the presence of the casting and supplies a signal to controller 14 for stopping the conveyor.

As shown in FIGS. 1-3, the knuckle casting at the reaming station is orientated on the conveyor in a nose-down position. As is well known in the art, a knuckle casting for a railway coupler has a nose portion identified in FIG. 2 by reference numeral 21. The nose contains a cored opening, commonly identified as a flag hole 22. A pulling face 23 is formed on the inner side of nose 21 and opposite the pulling face there is a front face 24 that extends along the outer surface of the casting to a heel 25. At heel 25, the outer surface of the casting proceeds rearwardly to a hub 26 that projects from each side of the casting and reinforces a pivot pin hole 27. The hub blends in with the top surface of the casting. Rearwardly of the hub there is a tail stop 28 from which the rear portion of the casting is commonly identified as a tail 29. As orientated on the conveyor in FIG. 2, the casting also defines a lock face 30 which is recessed above a lock shelf 31. As shown in FIGS. 2 and 3, in addition to dog attachments 11, the conveyor also includes brackets that support a guide plate 32. The guide plate has an opening centrally located between parallel runs of roller chains 10A and 10B that form the actual conveyor 10. A rod member 33 extends through an opening in plate 32 and through a guide 34 (FIGS. 1 and 2) into engagement with the upper end of pivot links 35 having a central pivot moved by an actuator 35A. The actuator, preferably a piston and cylinder assembly, pivots the links into an aligned relation, thereby displacing the rod 33 vertically to engage and disengage with the lock face of a knuckle casting. This raises the tail portion of the knuckle casting by producing a rotation thereof about the nose portion 21 which remains engaged with the conveyor. Preferably at the same time, the nose portion is raised from the conveyor by a rod 36 extending through an opening in a guide plate, similar to plate 32. The rod 36 is supported by a guide 36A and extends into engagement with the upper surface of a wedge 36B. Wedge 36B is lifted by longitudinal movement of a wedge 36C by operation of a piston and cylinder assembly, not shown. The casting is lifted from the conveyor so that the cored opening to form the pivot pin hole 27 is moved into an aligned relation with a reaming tool 37 at each side of the conveyor. The reaming tools are supported for longitudinal movement parallel to the rotational axis of the tool which is coupled to a drive motor 38. The reaming tool 37 and drive motor 38 are illustrated in FIG. 1 as perpendicular to pivot pin hole 27 but are actually aligned therewith. Prior to the actual reaming of the pivot pin hole, two gaging arms 39, one at each side of the casting, move laterally toward the sides of the casting on rollers 40 along a square support bar 41. Opposite ends of the bar 41 are supported by bearings for rotation thereof about the longitudinal axis of the bar. A drive 42 synchronously moves the arms toward the knuckle casting so that cone members 43 on downwardly-extending end portions of the arms engage with the pivot pin hole opening to assure precise positioning of the casting for the reaming operation. While the cone members 43 are engaged in the pivot pin hole openings, a clamp bar 44 is moved by a piston and cylinder assembly 45 about a pivot pin 46 to engage and apply a hold-down force to the top surface of the casting. The casting is properly elevated to a predetermined position for the reaming operation. Drive 42 is then energized to laterally displace arms 39 from the casting and thereafter a piston and cylinder assembly 47 is operated to pivot the arms about the axis of bar 41 in a direction whereby the cone members 43 are positioned above the casting. The pivot pin hole is then reamed to the proper size by movement of the reaming tools 37 from opposite sides of the casting.

Figure 4:
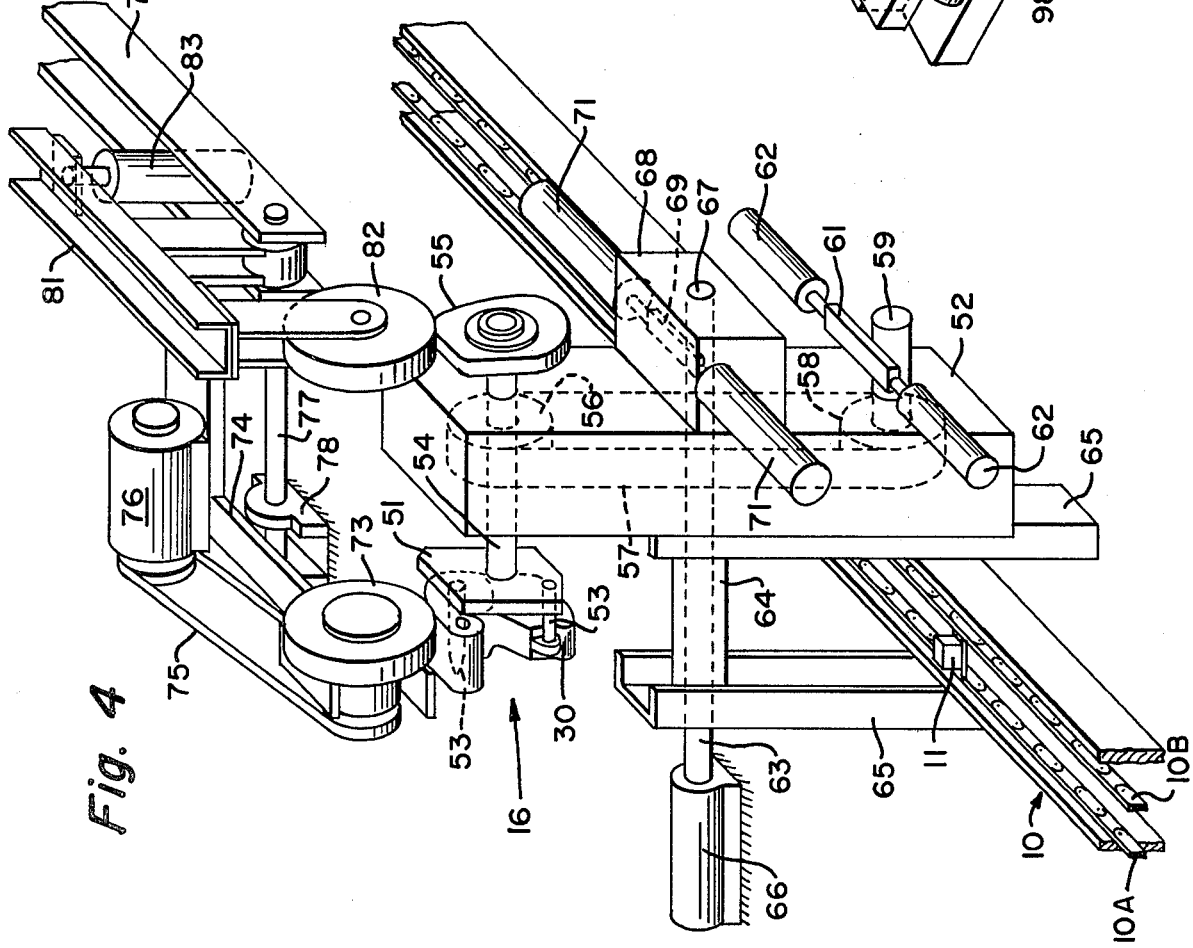
FIG. 4 is an isometric view of apparatus for machine-grinding a knuckle casting according to a predetermined desired profile.

After completion of the reaming operation, the conveyor is again energized to advance the casting to the first grinding station 16 where the conveyor is again stopped so that a more recently loaded casting on the conveyor is positioned at the reaming station. As shown in FIGS. 1 and 4, the knuckle casting is lifted from the conveyor by engagement with a knuckle holder 51 which is supported by an elongated pivot housing 52. The knuckle holder 51 includes a rectangular plate to support spaced-apart, knuckle-engaging pin members 53 extending from the face surface of the plate. The pins 53 are arranged so that one pin member extends through the reamed hole in the knuckle casting and the other pin member engages against the lock face 30. An arbor 54 projects from the side of the plate to the knuckle holder which is opposite the pin members 53. The arbor is rotatably supported by the housing 52 and projects from the opposite side where mounted onto the projected end is a cam 55. A sprocket 56 is moved onto a portion of the arbor located within the pivot housing. A chain belt 57 extends from the sprocket 56 to a sprocket 58 at the opposite end of the pivot housing where a shaft for the sprocket projects from the pivot housing and carries a drive gear 59. A rack segment 61 meshes with gear 59. The rack segment is guided by a bracket, not shown, for longitudinal movement by two piston and cylinder assemblies 62 disposed on opposite ends of the rack. Linear movement of the rack segment causes sprocket 58 to rotate which, in turn, drives sprocket 56 via the chain or belt 57 to thereby rotate a knuckle casting while engaged with knuckle holder 51.

The pivot housing 52 is rotated about a centrally-located support shaft 63 that extends through a carrier tube 64 arranged above the conveyor 10 and supported at its opposite ends by structural members 65. A piston and cylinder assembly 66 displaces the shaft 63 within tube support 64 so that rod members 53 of the knuckle holder are moved into and out engagement with a knuckle casting on the conveyor. The pivot housing 52 is rotated from a knuckle-engaging and disengaging position as shown in FIG. 1 to a grinding position by a drive that includes a pinion gear 67 secured to the free end of shaft 63 which projects from the pivot housing. A bracket 68 is attached to the pivot housing and supports a rack segment 69 for movement back and forth while the gear teeth thereof mesh with the teeth of pinion gear 67. Rack segment 69 is moved back and forth by oppositely-disposed piston and cylinder assembly 71.

The grinding apparatus is movably controlled according to a preestablished profile defined by cam 55. The grinding apparatus includes a grinding wheel 73 mounted on an arbor that is rotatably supported on a pivot frame 74. A pulley mounted on the arbor engages a belt 75 that extends to a pulley on a drive motor 76. The pivot frame 74 is supported by a pivot shaft 77 carried by bearing blocks 78 at one end of the shaft and structural support members 79 at the other end of the shaft. Between members 79, the pivot shaft 77 is drivingly engaged with a depending arm from a control frame 81. A follower roller 82 is carried by brackets on one end of frame 81 while the opposite end thereof engages with the rod end of a piston and cylinder assembly 83. The piston and cylinder assembly 83 maintains a desired pressure contact between the follower rollers 82 and cam 55. Rotation of cam 55 pivots the frame 81 about the shaft 77 to produce a corresponding pivotal movement of grinding wheel 73. By rotating the knuckle casting through the operation of the piston and cylinder assemblies 62, the outer peripheral surface of the casting is machined by the grinding wheel 73 to the preestablished profile defined by the cam 55. The grinding wheel and knuckle casting are orientated with respect to each other during the grinding process to grind a path along the casting that is above and below a usually visible demarcation line formed by the parting line at the joint of the cope and drag halves of the knuckle mold. The path of the grinding operation is determined, of course, upon the direction of rotation by the knuckle casting, but includes as best shown in FIG. 2, a surface area from the rear surface of the lock shelf at the lock face 30 along the tail surface 29 and along the arcuate path of tail stop 28. From tail stop 28, the grinding path proceeds to the outer peripheral surface of hub 26 along heel 25 which is another arcuate path and thence along the front face 24 to nose 21 where grinding extends about the radius from the nose to the start of pulling face 23.

At the conclusion of the grinding operation, pivot housing 52 is rotated through operation of the piston and cylinder assemblies 71 so that the ground knuckle casting is again replaced on the conveyor. The conveyor is then operated to advance the casting to the finish-grinding station 17 whereupon the casting is again lifted and rotated by the use of apparatus that is essentially identical with the apparatus already described and shown in FIG. 4. At the finish-grinding station, the lifting and rotating apparatus does not include the use of a cam but, instead, the finish-grinding operation is carried out by maintaining a predetermined pressure between the casting on a grinding belt 90 while the casting is rotated by the operation of piston and cylinder assemblies 62. The grinding belt 90 has an endless configuration and is supported by a pressure roller 91 at the point of contact with the casting. Rollers 92 and 93 support the belt while tensioned by the force of a spring that is applied to an idler roller 94. At least one of the rollers 91–94 is driven as by motor 95. The grinding belt is supported within a cabinet 96. The cabinet, in turn, is supported on slide assemblies 97 while carried on a suitable foundation support.

Figure 5:
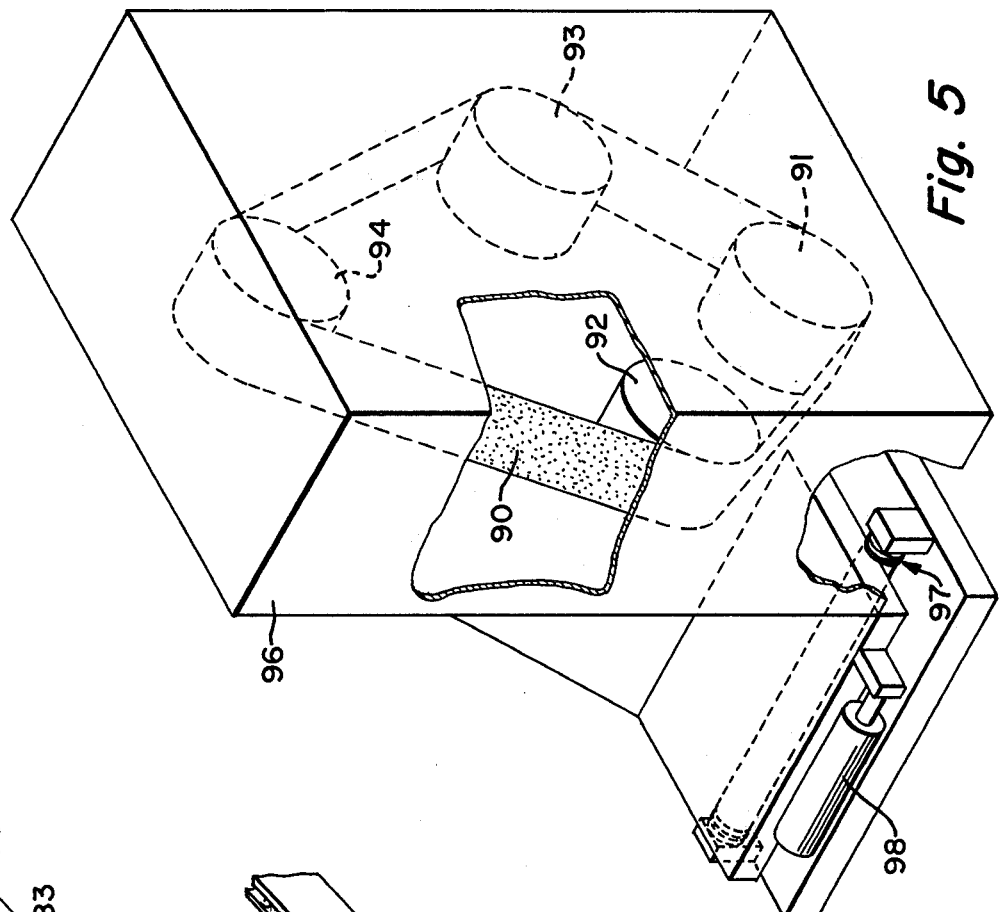
FIG. 5 is an isometric view of a belt grinder to carry out finish-grinding operations on a knuckle casting at a second grinding station.

As shown in FIG. 5, a piston and cylinder assembly 98 is supported on the foundation while the rod end thereof is attached by a bracket to the cabinet of the housing. The piston and cylinder assembly 98 is operated to reciprocate the housing and thereby the grinding belt through a short stroke, typically 2–3 inches, to distribute wear across the face of the grinding belt during the finish-grinding operation. The surface of the casting that is ground during the finish-grinding operation is the same surface which is rough-ground by the use of grinding wheel 73. The piston and cylinder assemblies 62 are energized to rotate the knuckle casting for the finish-grinding operation and at the conclusion thereof, the piston and cylinder assemblies 71 are energized to rotate the pivot housing and return the finish-ground knuckle casting to the conveyor whereupon the conveyor is again energized to advance the casting to a discharge station where it is removed from the conveyor and placed on a pallet or container 18.

The grinding of a knuckle casting, according to the method and apparatus of the present invention, dispenses with the time-consuming and laborious hand-grinding operations while assuring that the required clearances are consistently attained for a proper fit of the knuckle casting within the body of a railroad coupler to assure reliable operation of the coupler. The grinding operation assures that the necessary and required clearance will always exist between the rear of the knuckle tail and the front of the face of a lock element during the "lock set," "knuckle throw" and "lock drop" functions. The necessary clearance is maintained between the rear of the knuckle tail, a tail stop in the coupler housing, the wall hub area, and other areas between the knuckle casting and the coupler body to maintain proper operating clearances for knuckle pivot and dropping of the lock member into the locked position. The method and apparatus of the present invention are readily useful for producing a standard AAR 10A contour with a finish-ground surface on the knuckle heel, front face and nose for establishing adequate clearance and proper contour for slack with a mated coupler and its knuckle during hinge movement action in a train tracking around a track with a horizontal curve. The knuckle tail is finish-ground to fit in the coupler. The method and apparatus of the present invention are readily useful for both E-type and F-type knuckles. As is well known by those skilled in the art, a Type-E knuckle is used in Type E and E/F couplers whether fitted for top or bottom mode of operation while a Type-F knuckle is used in all Type-F interlocking couplers.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. A method for processing a knuckle casting for a railroad coupler wherein the knuckle casting includes a nose portion to engage with the nose portion of a knuckle of a mating coupler when the couplers are coupled together, the knuckle casting having an outer peripheral surface defining inter alia a front face extending from said nose portion laterally and rearwardly to a heel adjacent a surface of a hub for a pivot pin opening through the body of the knuckle casting, the knuckle casting rearwardly of said hub having a tail stop merging with a tail surface forming the generally-rearward extremity of the casting, said method including the steps of moving a knuckle casting to a reaming station with the pivot pin opening extending transverse to the direction of movement, aligning the pivot pin opening in the knuckle casting with reaming means, holding the aligned knuckle casting while reaming the pivot pin opening to a desired size, moving the knuckle casting to a lifting station, supporting the knuckle casting at the lifting station for rotation about an axis generally parallel to the axis of the reamed pivot pin opening, grinding at least said front face, heel, tail stop and tail surface of the knuckle casting to a preestablished profile while rotating the casting about an axis generally parallel with the axis of the reamed pivot pin opening, and thereafter contacting at least part of the outer peripheral surface of the knuckle casting while rotated about an axis generally parallel to the axis of the reamed pivot pin opening with a machine member under a predetermined pressure to finish-grind the contacted surface.

2. The method according to claim 1 wherein said step of grinding includes rotating a cam while rotating the casting to controllably position a grinder according to a preestablished profile defined by said cam.

3. The method according to claim 1 wherein said step of aligning the pivot pin opening includes pivoting the knuckle casting about the nose portion thereof.

4. The method according to claim 3 wherein said step of aligning further includes moving centering arms into engagement with the pivot pin opening in the knuckle casting, and thereafter remotely positioning said arms from the pivot pin opening.

5. A method for processing a knuckle casting for a railroad coupler wherein the knuckle casting includes a nose portion to engage with the nose portion of a knuckle of a mating coupler when the couplers are coupled together, the knuckle casting having an outer peripheral surface defining inter alia a front face extending from said nose portion laterally and rearwardly to a heel adjacent a surface of a hub for a pivot pin opening through the body of the knuckle casting, the knuckle casting rearwardly of said hub having a tail stop merging with a tail surface forming the generally-rearward extremity of the casting, said method including the steps of moving a knuckle casting to a reaming station with the pivot pin opening extending transverse to the direction of movement, aligning the pivot pin opening in the knuckle casting with reaming means, holding the aligned knuckle casting, reaming the pivot pin opening to a desired size, supporting the knuckle casting at the discharge station for rotation about an axis generally parallel to the axis of the reamed pivot pin opening after said step of reaming, grinding at least said front face, heel, tail stop and tail surface of the knuckle casting to a preestablished profile while rotating the casting about an axis generally parallel with the axis of the reamed pivot pin opening, and moving the knuckle casting with the reamed pivot pin opening to a discharge station.

* * * * *